United States Patent [19]
Griesmer et al.

[11] Patent Number: 5,878,124
[45] Date of Patent: Mar. 2, 1999

[54] UNIVERSAL TELEPHONE SYSTEM AND METHOD

[75] Inventors: Stephen J. Griesmer, Westfield; Yzhak Ronen, West Windsor, both of N.J.

[73] Assignee: AT&T Corp, Middletown, N.J.

[21] Appl. No.: 720,827

[22] Filed: Oct. 3, 1996

[51] Int. Cl.[6] .......................... H04M 11/00; H04M 17/00; H04M 3/42

[52] U.S. Cl. ...................... 379/201; 379/207; 379/93.17; 379/144; 379/357

[58] Field of Search .................................... 379/201, 207, 379/93.17, 93.23, 110.01, 144, 112, 114, 115, 121, 130, 131, 140, 357, 143

[56] References Cited

U.S. PATENT DOCUMENTS

| | | | |
|---|---|---|---|
| 4,899,373 | 2/1990 | Lee et al. | 379/207 |
| 5,436,436 | 7/1995 | Matsukawa | 379/144 |
| 5,524,049 | 6/1996 | Akiyama | 379/201 |

*Primary Examiner*—Harry S. Hong
*Assistant Examiner*—Benny Q. Tieu

[57] ABSTRACT

A universal telephone located in a foreign country provides a consistent home country telephone appearance and functions for a caller visiting the foreign country. This service includes providing consistent dialing sequences, consistent directory services, and other operations that would be consistent with originating the call from the caller's home country. The universal telephone includes a smart card reader that receives a smart card presented by the caller, bearing information of the caller's ID, the caller's home country, and other information. A database of national telephone features that are characteristic of the caller's home country can be included in the universal telephone or can be contained on the smart card. When the caller inserts his smart card into the universal telephone, the caller's home country information is read from the card. The universal telephone accesses the database to obtain the telephone appearance and functions of the home country. The text of messages in the language of the home country is displayed on a display screen of the universal phone. The image of the dialing key pad is also displayed on the display screen. The action to be performed in response to each key is provided to logic associated with a touch overlay device positioned on the surface of the display screen. When the caller presses the touch overlay device at a location over the image of a key, the corresponding action is performed by the logic. Actions include forming a string of dialing digits in the home country's format, for transmission to a universal server, which translates it into a network code that enables establishment of the call.

43 Claims, 15 Drawing Sheets

COMMON CHANNEL SIGNALLING PATH 102 FROM UNIVERSAL TELEPHONE IN LONDON TO UNIVERSAL SERVER IN USA

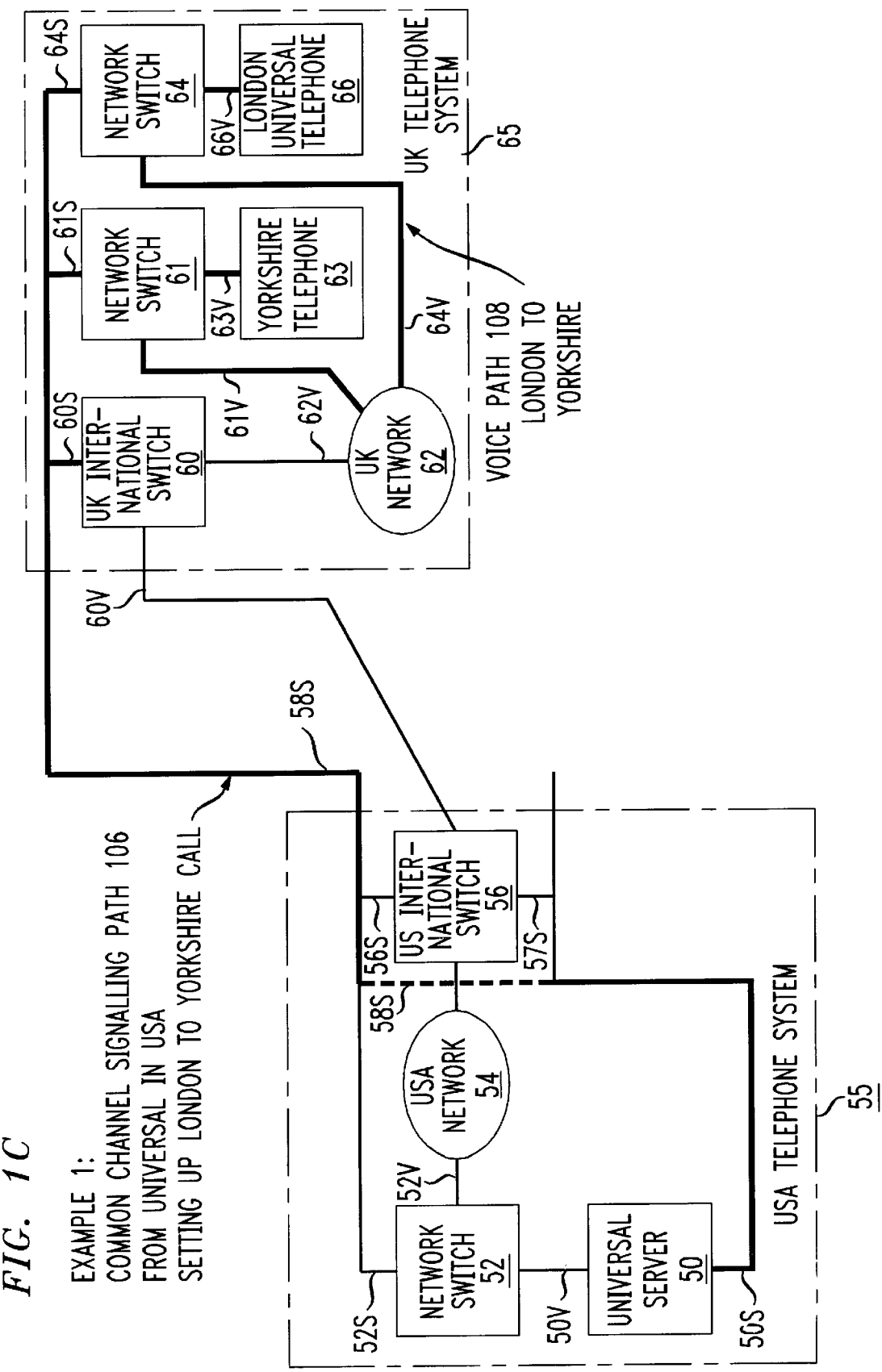

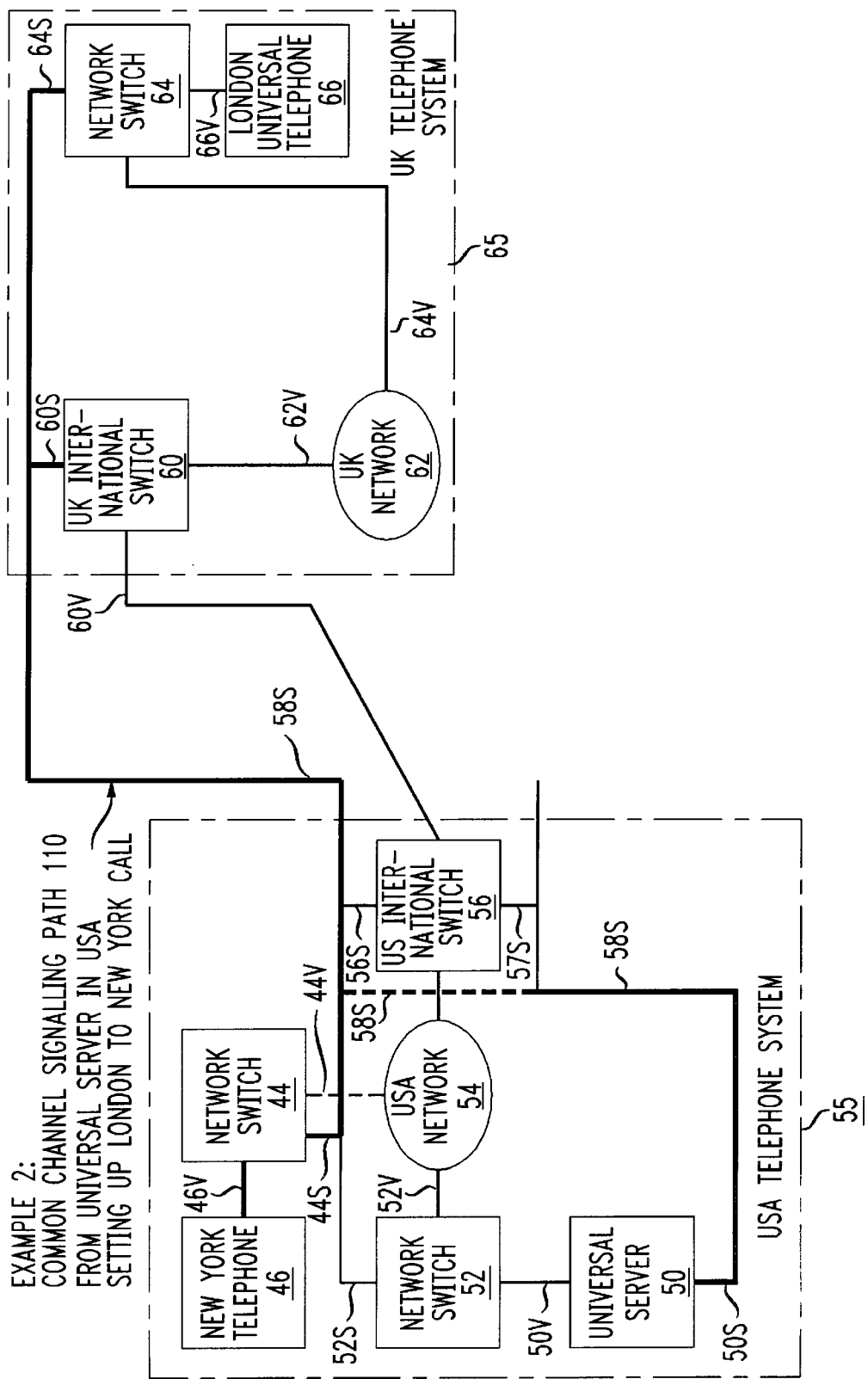

EXAMPLE 3:
COMMON CHANNEL SIGNALLING PATH 114
FROM UNIVERSAL SERVER IN USA
SETTING UP LONDON TO PARIS CALL

EXAMPLE 3:
VOICE TRUNK PATH 116
FROM UNIVERSAL TELEPHONE IN LONDON
TO PARIS TELEPHONE

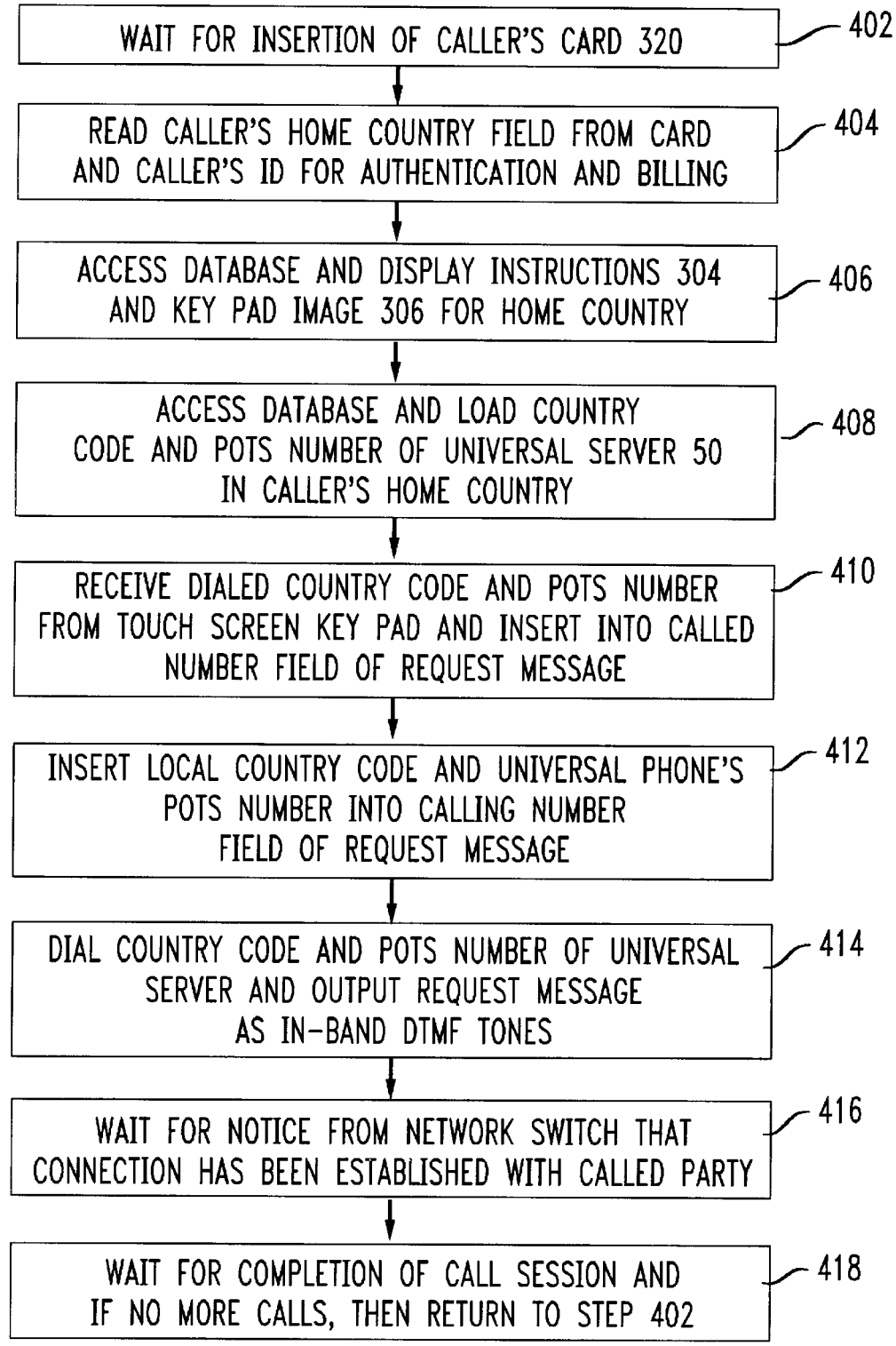

5,878,124

UNIVERSAL TELEPHONE SYSTEM AND METHOD

BACKGROUND OF THE INVENTION

1. Field of The Invention

The invention broadly relates to telecommunications systems, services, and methods. The invention more particularly relates to a universal telephone system that presents a consistent telephone service with the characteristics that telephones have in a caller's home country, to caller's originating calls from a foreign country.

2. Description of Related Art

Telephones in a foreign country are difficult for travelers to use. The instructions to operate the telephone might be in a foreign language, the layout and function of the dialing key pad is unfamiliar, and the sequence of dialing digits and exchange codes is unique to the country. AT&T's USADirect (R) (registered trademark) service is offered to US residents to make calling easier in foreign countries. However, with this service and other similar services, a local phone call has to be made in the format of the foreign country to reach the USADirect (R) service. No local assistance is provided to help the caller with the required phone number or instructions how to use the phone. What is needed is a telephone that can be used in a consistent way independent of the country from where the call is placed.

SUMMARY OF THE INVENTION

A universal phone located in a foreign country provides consistent home country telephone appearance and functions for a caller visiting the foreign country. The national telephone features that are characteristic of the caller's home country are stored in a database in the universal telephone or in a smart card inserted into the universal telephone by the caller. Each set of features for a given home country includes the text of messages in the language of the home country, the image of the dialing key pad and the actions to be performed in response to each key, and the network address of a universal server that translates the caller's dialed number in the caller's hone country format into a network code that enables establishment of the call. The universal phone includes a smart card reader that receives a smart card presented by the caller, bearing information of the caller's ID, the caller's home country, and other information.

When the caller inserts his smart card into the universal phone, the caller's home country information is read from the card. The home country information is obtained from the database in the universal server or in the smart card. The home country information includes the telephone appearance and functions of the home country. The text of messages in the language of the home country is displayed on a display screen of the universal phone. The image of the dialing key pad is also displayed on the display screen. The action to be performed in response to each key is provided to logic associated with a touch overlay device, such as a conventional laminated, transparent membrane positioned on the surface of the display screen. When the caller presses the touch overlay device at a location over the image of a key, the corresponding action is performed by the logic. Actions can include exercising local control over the phone such as changing the volume of the sound from the earpiece. Actions can also include placing a call for assistance to an operator in the home country. In accordance with the invention, actions include forming a string of dialing digits in the home country's format, for transmission to the universal server. The network address of the universal server is accessed from the database in the universal telephone or in the smart card.

The universal server is typically located in the caller's home country, but can also be located elsewhere. The string of dialing digits is transmitted to the universal server which translates the caller's dialed number in the caller's home country format, into a network code that enables establishment of the call. The universal telephone can transmit the dialing digits to the universal server by means of an out-of-band signaling system such as Signaling System 7. Alternately, the universal telephone can transmit the dialing digits to the universal server by means of in-band signaling where the universal telephone creates a voice path to the universal server over which DTMF signals or dialing pulses are conveyed to the server. In an alternate embodiment, the translation logic of the universal server can be contained within the universal telephone, to translate the caller's dialed number in the caller's home country format, into a local country code that enables establishment of the call.

BRIEF DESCRIPTION OF THE DRAWINGS

FIG. 1C shows Example 1, of the common channel signalling path 106 from the universal server in the USA setting up a call from London to Yorkshire. The figure also shows the resulting voice path 108 between London and Yorkshire.

FIG. 1D shows Example 2, of the common channel signalling path 110 from the universal server in the USA setting up a call from London to New York.

FIG. 4 is a flow diagram of the sequence of operational steps in the control program 400 of the universal phone.

DESCRIPTION OF A PREFERRED EMBODIMENT OF THE INVENTION

Figure 1:
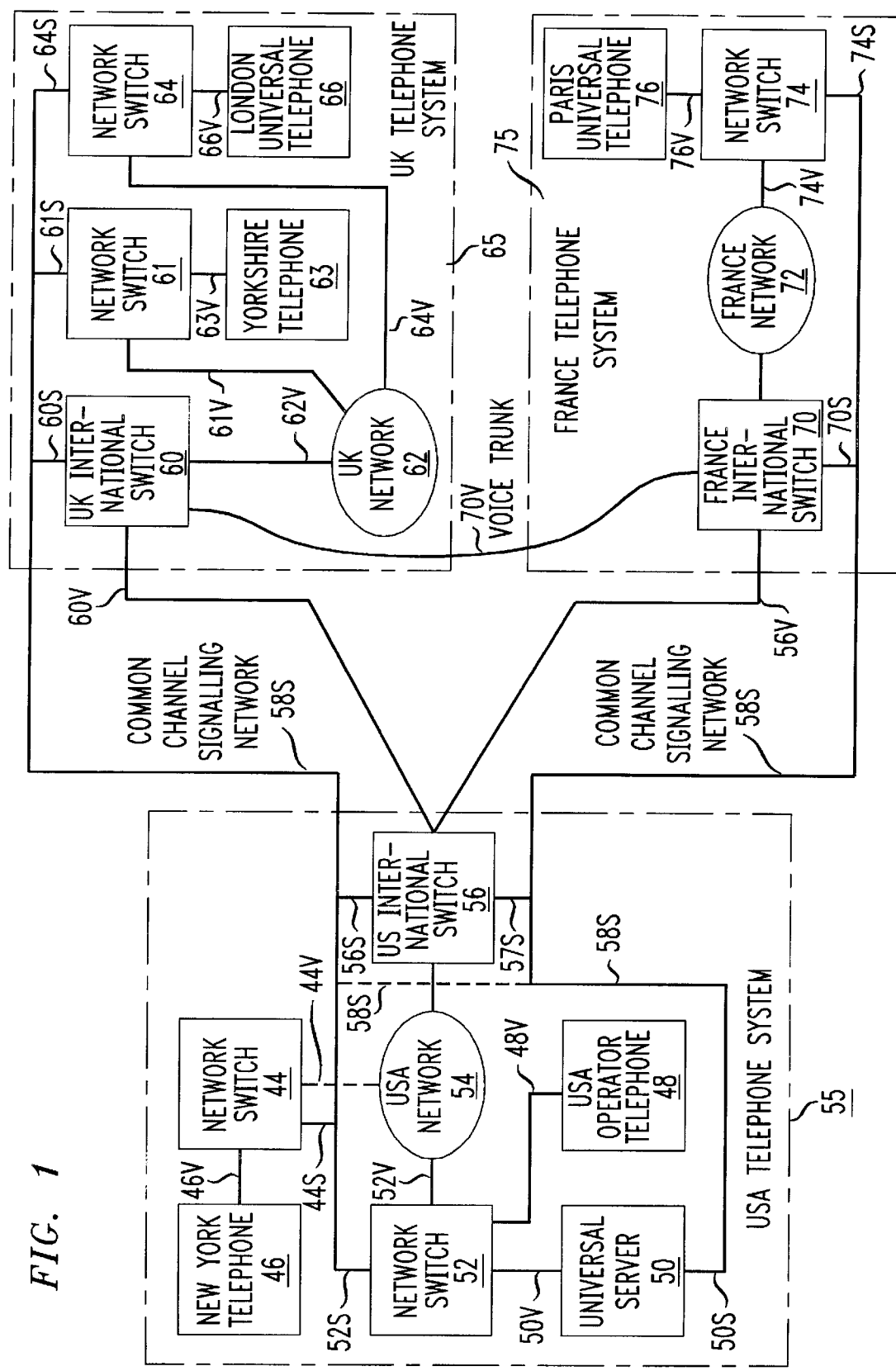
FIG. 1 is a network diagram of a common channeling signalling network and voice trunk network linking a universal phone 66 in London, a universal phone 76 in Paris, and the universal server 50 in the USA.

The network diagram of FIG. 1 shows two universal telephones 66 and 76 connected in a telephone network to the universal server 50. The network of FIG. 1 includes the common channel signalling network 58S and the voice trunk network 70V. As a naming convention in this document, network reference ending in the letter "S" pertain to portions of the common channel signalling network and reference ending in the letter "V" pertain to portions of the voice trunk network. Common Channel Signaling is a network architecture which uses Signaling System 7 (SS7) protocol for the exchange of information between telecommunications nodes and networks on an out-of-band basis. It performs three major functions: 1. It allows the exchange of signaling information for interoffice circuit connections. 2. It allows the exchange of additional information services and features, e.g. CLASS, database query/response, etc. 3. It provides-improved operations procedures for network management and administration of the telecommunications network. A universal telephone 66 is located in London, United Kingdom in FIG. 1 and it is connected through the network switch 64 by means of the voice line 66V. The network switch is controlled by the common channel signalling (CCS) line 64S and selectively connects the universal telephone 66 over the line 64V to the UK network 62. FIG. 1 also shows a telephone 63 located in Yorkshire, United Kingdom which is connected by the line 63V to the network switch 61. Network switch 61 is controlled by line 61S to selectively connect telephone 63 over line 61V to the UK network 62. The UK international switch 60 is also shown in FIG. 1 controlled by means of line 60S to selectively connect voice trunks 60V or 70V over line 62V to the UK network 62. The UK telephone system 65 includes the UK international switch 60, the UK network 62, the network switch 61, the Yorkshire telephone 63, the network switch 64, and the London Universal telephone 66.

The USA telephone system 55 shown in FIG. 1 shares the common channel signalling network 58S with the UK telephone system 65 and with the France telephone system 75. The US telephone system 55 includes the US international switch 56 which is connected by means of lines 56S and 57S to the CCS network 58S. The USA network 54 is connected to the US international switch 56 by means of line 54V (shown in FIG. 1B). The network switch 44 is controlled by means of line 44S to selectively connect the New York telephone 46 over line 46V and 44V to the USA network 54. The network switch 52 is controlled by line 52S to selectively connect the USA network 54 over 52V to the universal server 50 over line 50V or to the USA operator telephone 48 over line 48V. The universal server 50 outputs common channel signalling messages over line 50S to the common channel signalling network 58S.

The second universal telephone 76 shown in FIG. 1 is located in Paris, France and is a part of the France telephone system 75. Universal telephone 76 is connected by line 76V to a network switch 74. Network switch 74 is controlled by line 74V to selectively connect the universal telephone 76 to the France network 72 over line 74B. The France international switch 70 is controlled by line 70S to selectively connect the France network 72 to the voice trunk 70V from the UK telephone system 65 or the voice trunk 56V from the US international switch 56. Three examples of the operation of the network in FIG. 1, in accordance with the invention, are shown in FIGS. 1A–1G which will be described below.

The universal telephone 66 can transmit the dialing digits to the universal server 50 by means of an out-of-band signaling system such as Signaling System 7. Alternately, the universal telephone 66 can transmit the dialing digits to the universal server 50 by means of in-band signaling where the universal telephone 66 creates a voice path to the universal server over which DTMF signals or dialing pulses are conveyed to the universal server 50.

Figure 2:
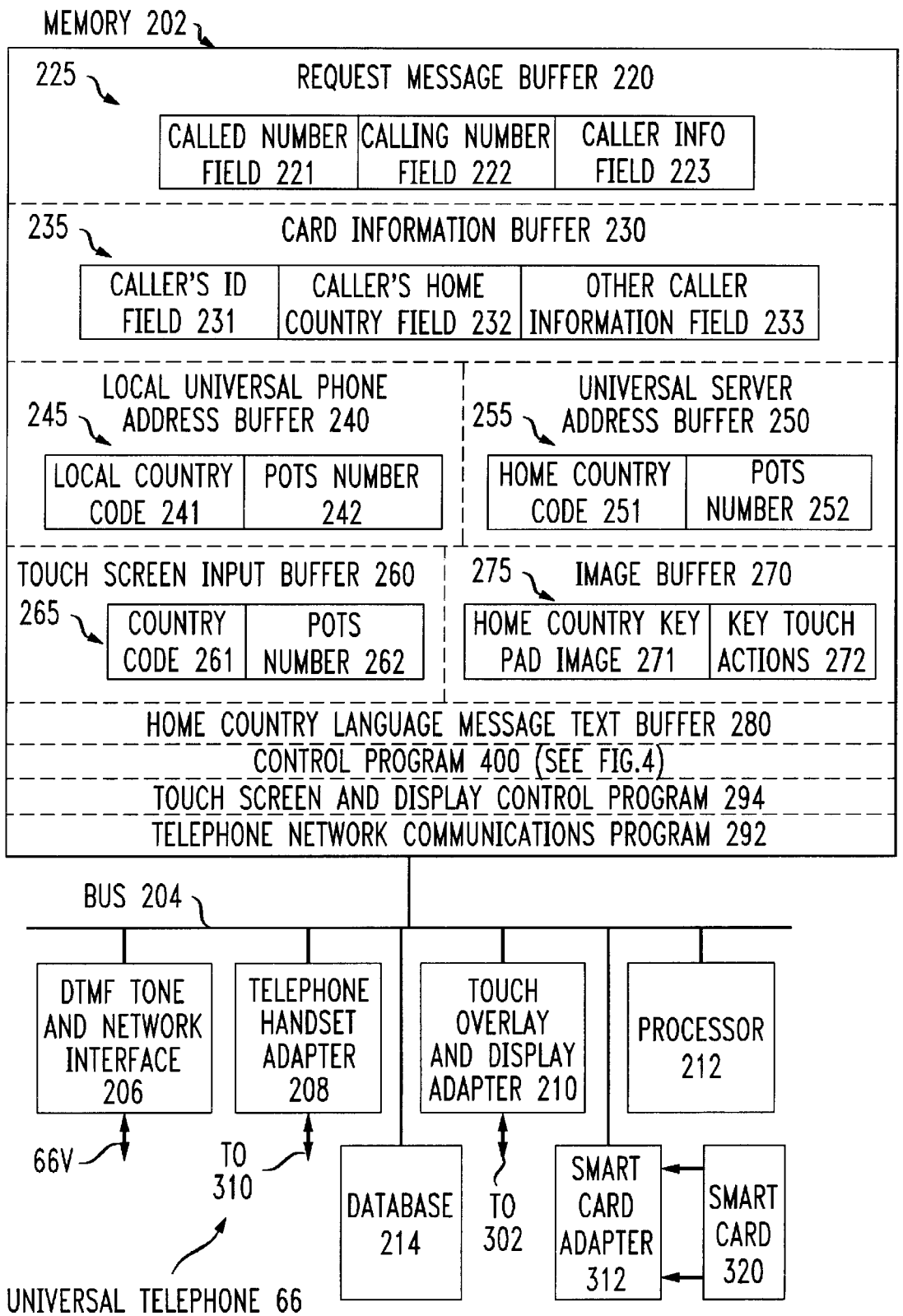
FIG. 2 is a functional block diagram of the universal phone 66.

The universal telephone 66 is shown in greater detail in FIG. 2. The universal telephone 66 is designed for location in a foreign country such as the United Kingdom or France, to provide USA home country telephone appearance and functions for a USA caller visiting the foreign country. FIG. 2 shows the universal telephone 66 including the memory 202 connected by means of the bus 204 to the DTMF (dual tone multifrequency) tone and network interface 206 which connects over the voice line 66V to the network switch 64 of FIG. 1. Also shown in FIG. 2 is the bus 204 connected to the telephone handset adapter 208 which is connected to the telephone 310 shown in FIG. 3A. Also shown in FIG. 2 is the bus 204 connected to the touch overlay and display adapter 210 which is connected to the touch overlay and display 302 shown in FIG. 3A. Also shown in FIG. 2 is the bus 204 connected to the processor 212. Also shown in FIG. 2 is the bus 204 connected to the database 214 and to the smart card reader or adapter 312. The smart card adapter 312 accepts engagement with the smart card 320, in accordance with the invention. The universal telephone 66 includes the database 214 containing national telephone features that are characteristic of the caller's home country. Each set of features for a given home country includes the text of messages in the language of the home country, the image of the dialing keypad and the actions to be performed in response to each key, and the network address of the universal server 50 that translates the caller's dialed number which is in the caller's home country format, into a network code that enables the establishment of the call.

Figure 6:
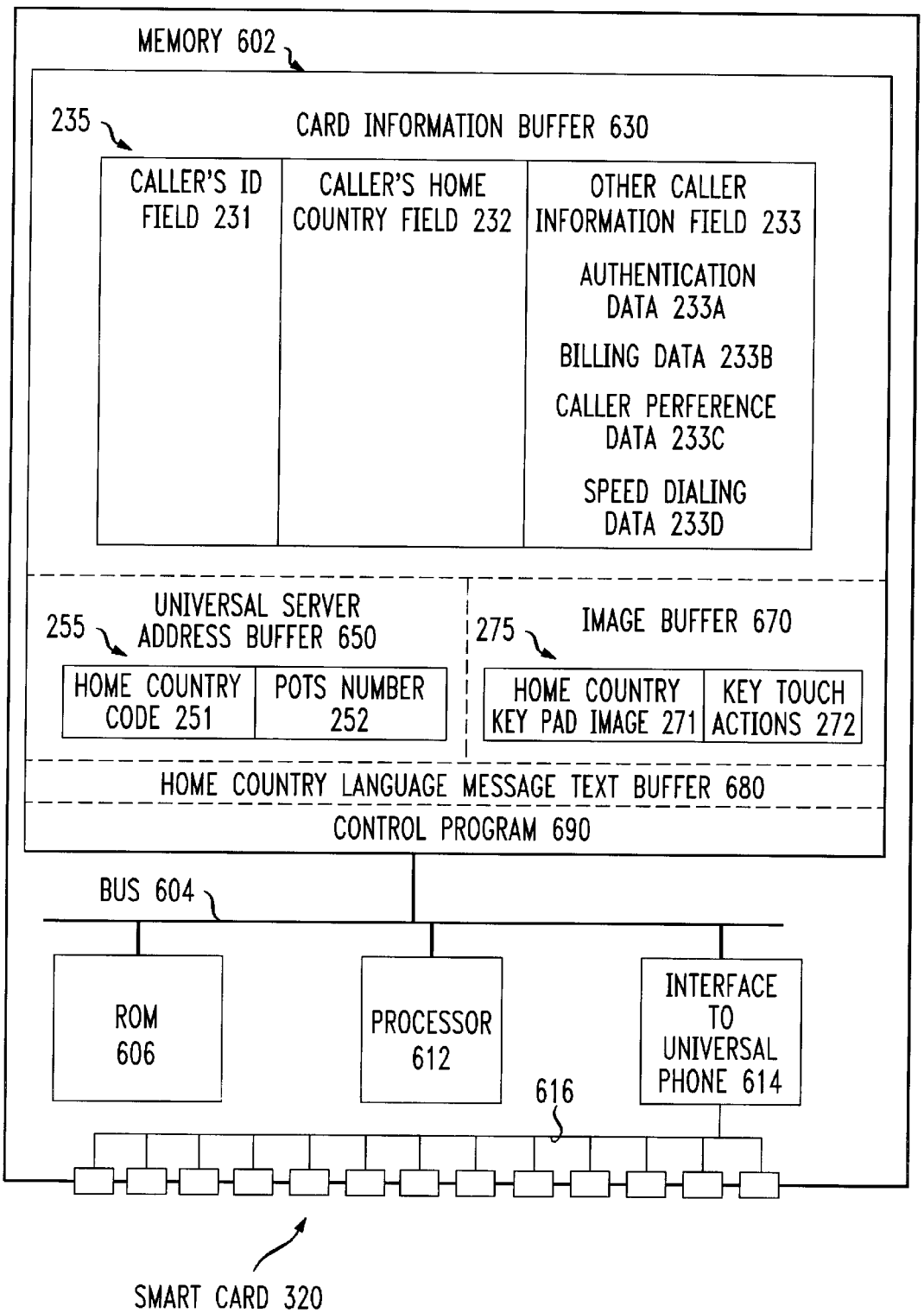
FIG. 6 shows the smart card 320.

The smart card 320 shown in FIG. 2 and shown in greater detail in FIG. 6, bears information of the caller's identity, the caller's home country, and other information for authentication purposes for billing purposes, the caller's preferences for features to be provided by the universal phone 66, and other information. Additionally, some portion of the national telephone features that are characteristic of the caller's home country can be stored in the smart card 320, as is shown in FIG. 6.

The memory 202 of the universal telephone 66 in FIG. 2 includes a request message buffer 220 which stores a request message 225 which includes a called number 221, a calling number field 222, and a caller information field 223. The memory 202 also includes a card information buffer 230, which stores the card information 235 read from the smart card 320, including the caller's ID field 231, the caller's home country field 232, and other caller information in the field 233, such as authentication and billing information and preferences the caller has for features to be presented to the caller by the universal telephone 66.

The memory 202 also includes the local universal phone address buffer 240 which stores the information 245 including the local country code 241 and the POTS (plain old telephone system) number 242. The local universal phone address information 245 is stored in the memory 202 based upon the location of the universal telephone 66 in the UK telephone system 65. The universal telephone 76 located in Paris, France in the France telephone system 75, will have different values for local country code 241 and POTS number 242.

The memory 202 also includes the universal server address buffer 250 which includes the information 255 including the home country code 251 and the POTS number 252 for the universal server 50. The universal server address information 255 is obtained from the smart card 320 when it is read by the smart card adapter 312. Although the universal server 50 is typically located in the caller's home country, for example the USA telephone system 55 in FIG.

1, the universal server storing the home country information for a particular caller, can be located in other countries besides the caller's home country. In that case, the country code 251 and the POTS number 252 for universal server address information 255 will pertain to the actual location of the universal server 50 in the network.

Memory 202 also includes the image buffer 270 which includes information 275 including the home country keypad image data 271 and the key touch actions data 272. This information is usually stored in a database 214 for the universal telephone 66. When a caller inserts his smart card 320 into the smart card adapter 312, the caller's home country information is read from the card. The information on the card may be protected by a PIN number of pass word that must be input by the caller before proceeding. Home country information is used to access the database 214 to obtain the telephone appearance and functions of the home country, including the home country keypad image data 271 and key action data 272. The text of messages in the language of the home country is accessed from a database 214 and stored in the home country language message text buffer 280. The text of messages in the language of the home country is then displayed on the display screen 302 of the universal telephone 66, as is shown if FIG. 3A. The image 306 of the dialing keypad is also displayed on the display screen 302. The actions to be performed in response to each key are stored in the key touch actions field 272 in memory 202, associated with a conventional, laminated, transparent, touch overlay membrane positioned on the surface of the display screen 302. When the caller presses the touch overlay membrane at a location over the image of a key, the corresponding action is performed by the universal telephone 66. Actions can include exercising local control over the universal telephone 66 such as changing the volume of sound from the earpiece of the telephone handset 310. Actions can also include placing a call for assistance to an operator in the home country at the USA operator telephone 48 in FIG. 1.

The memory 202 in FIG. 2 also includes the touch screen input buffer 260, which includes the information 265 which is received from the touch overlay and display adapter 210, when the caller presses the touch overlay membrane at a location over the image of a key. The touch screen input information 265 includes the country code 261 and the POTS number 262 that the caller dials when calling a called party.

The memory 202 also stores the control program 400 shown in greater in the flow diagram of FIG. 4. Memory 202 also includes a touch screen and display control program 294 which controls the operation of the touch overlay and display adapter 210 for detecting when the caller presses the touch overlay membrane at a location over the image of the key, and which initiates the corresponding action. Memory 202 also includes a telephone network communications program 292 which enables the universal telephone 66 to communicate with the network over line 66V through the DTMF tone and network interface 206. These programs are sequences of executable instructions that are executed by the processor 212 to perform the operations of the programs.

Figure 3A:
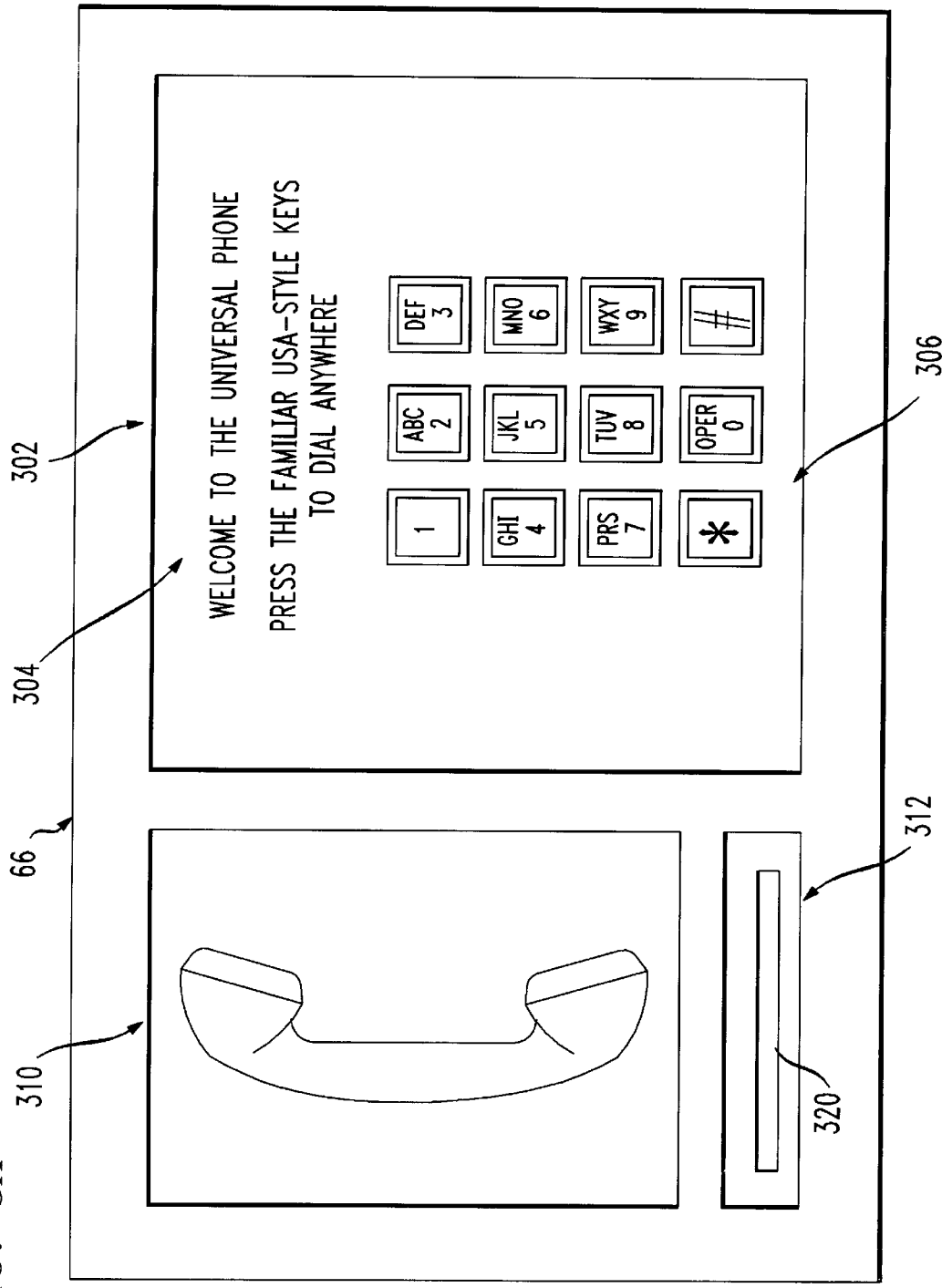
FIG. 3A shows the front face of the universal phone 66, configured by the smart card 320 to manifest the telephone features for the USA as a home country.
Figure 3B:
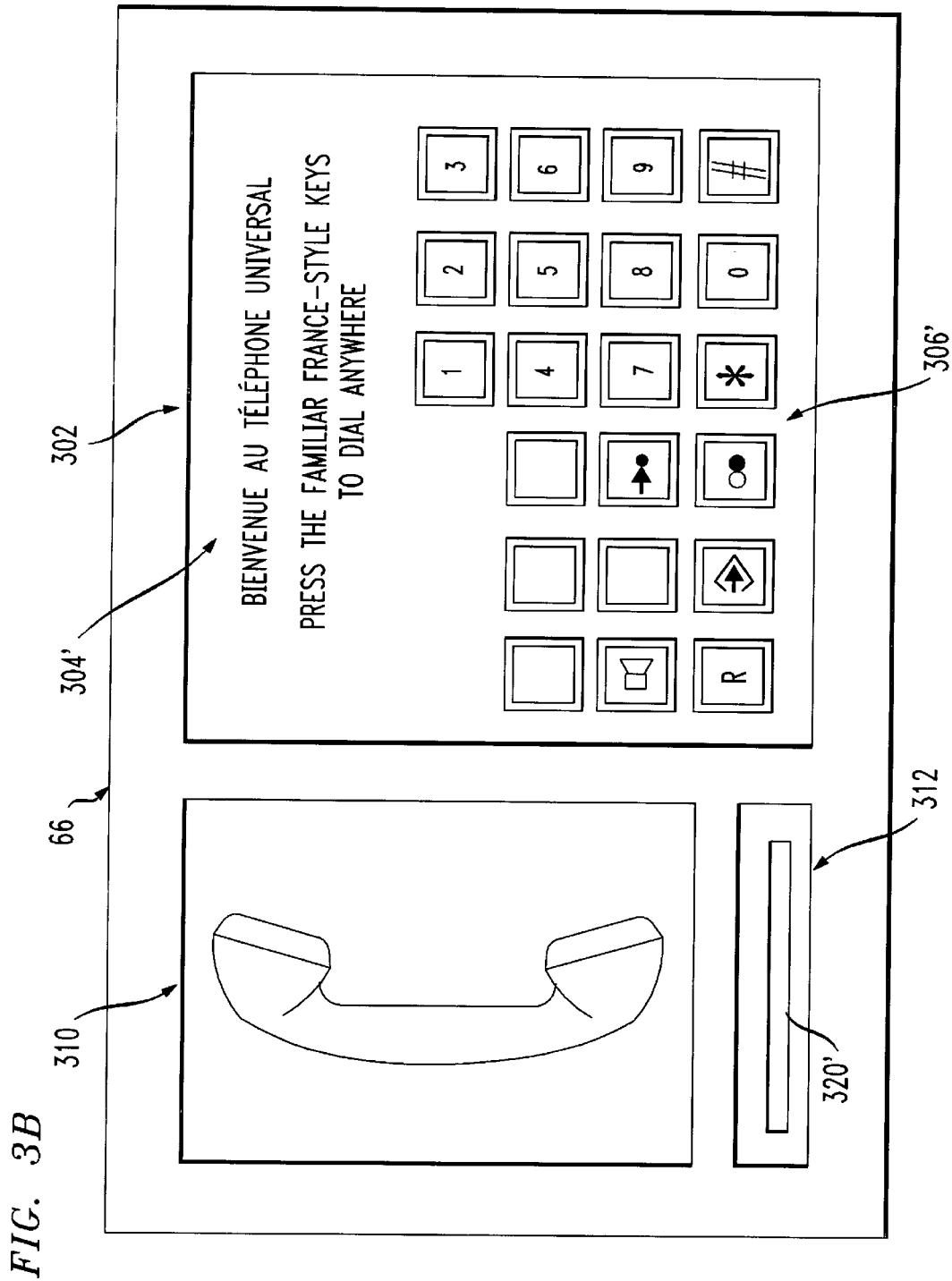
FIG. 3B shows the front face of the universal phone 66, configured by the smart card 320 to manifest the telephone features for a non-USA country as a home country.

The front face of the universal telephone 66 shown in FIG. 3A as it appears in the universal telephone 66 located in London, UK. The universal telephone 66 shown in FIG. 3A is configured by the caller's smart card 320 inserted into slot 312 to manifest the telephone features for the USA as a home country. The message 304 expressed in English "Welcome to the universal phone" is displayed on the screen 302. The USA style keypad image 306 is also displayed on the screen 302. FIG. 3B illustrates the universal telephone 66 located in London, UK, configured by a second caller's smart card 320' for a home country which is not the USA. The text message 304' is expressed in the home country language, for example in French: "Bienvenue Au Telephone Universel". The dialing keypad image 306' for the layout of one example of non-USA telephones is also displayed on the display screen 302.

FIG. 4 is a flow diagram of the sequence of operational steps in the control program 400 of the universal telephone 66. The program 400 stored in the memory 202 of the universal telephone 66 of FIG. 2 is a sequence of executable instructions, which when executed by the processor 212, carry out the functions of program 400. FIG. 4 shows the first step of program 400 as step 402 which waits for the insertion of the caller's smart card 320. Then in step 404, the caller's card 320 is read to obtain the caller's home country field 232 and the caller's identity field 231 and other caller information from the field 233, for authentication, billing, and personal preferences that the caller has for the configuration of the universal telephone 66. The flow diagram of FIG. 4 then steps to step 406 which accesses the database 214 and displays the instructional messages 304 and a keypad image 306 on the display 302 for the caller's home country. Then in step 408, the database 214 is accessed and the country code and POTS numbers 251 and 252 for the universal server 50 are loaded into the address buffer 250 of the memory 202. Step 410 of FIG. 4 receives the dialed digits from the touch overlay and display adapter 210 when the caller presses the touch overlay membrane at selected locations over the images of keys displayed on the display screen 302. The dialed digits for the country code are entered into the field 261 of the touch screen input buffer 260 and the dialed digits for the POTS number are entered into the field 262 of the touch screen input buffer 260. The dialed digits from the touch screen input buffer 260 are then loaded into the called number field 221 of the request message 225. Similarly, in Step 412, the local universal phone address information 245 in buffer 240 including the local country code 241 and POTS number 242 are loaded into the calling number field 222 of the request message 225. In accordance with the invention, the string of dialing digits in the called number field 221 of the request message 225 is in the home country's format. The universal phone 66 transmits the request message 225 to the universal server 50 in Step 414. The network address of the universal server 50 in the address buffer 250 of the memory 202, is used as the destination for the request message 225 when it is transmitted from the universal telephone 66 in the UK to the universal server 50 in the USA telephone system 55. In the embodiment of the invention described herein, the request message 225 is sent as an in-band signal over the voice line 66V by converting the dialed digits into DTMF tones in the interface 206 for transmission over the voice trunk network shown in FIG. 1. For example, a call from London Yorkshire, UK is initiated by the common channel signalling path 102 in FIG. 1A. The request message 225 is sent over the resulting voice trunk path 104 in FIG. 1B to the universal server 50.

Then step 416 of FIG. 4 waits for notice from the network switch 64 that the voice trunk connection 108 in FIG. 1C has been established from the universal telephone 66 in London to the called party in Yorkshire by the common channel signalling network. Then in step 418, the call session between the calling party and the called party over voice trunk path 108 in FIG. 1C continues until its completion. If the caller desires to make additional calls from the universal telephone 66, the caller can so indicate by pressing the appropriate key on the keypad 306 displayed on the display screen 302. However, if the caller does not desire to place anymore calls, then the flow diagram of FIG. 4 passes to step 402 which waits for the insertion of the next caller's card 320.

Figure 5A:
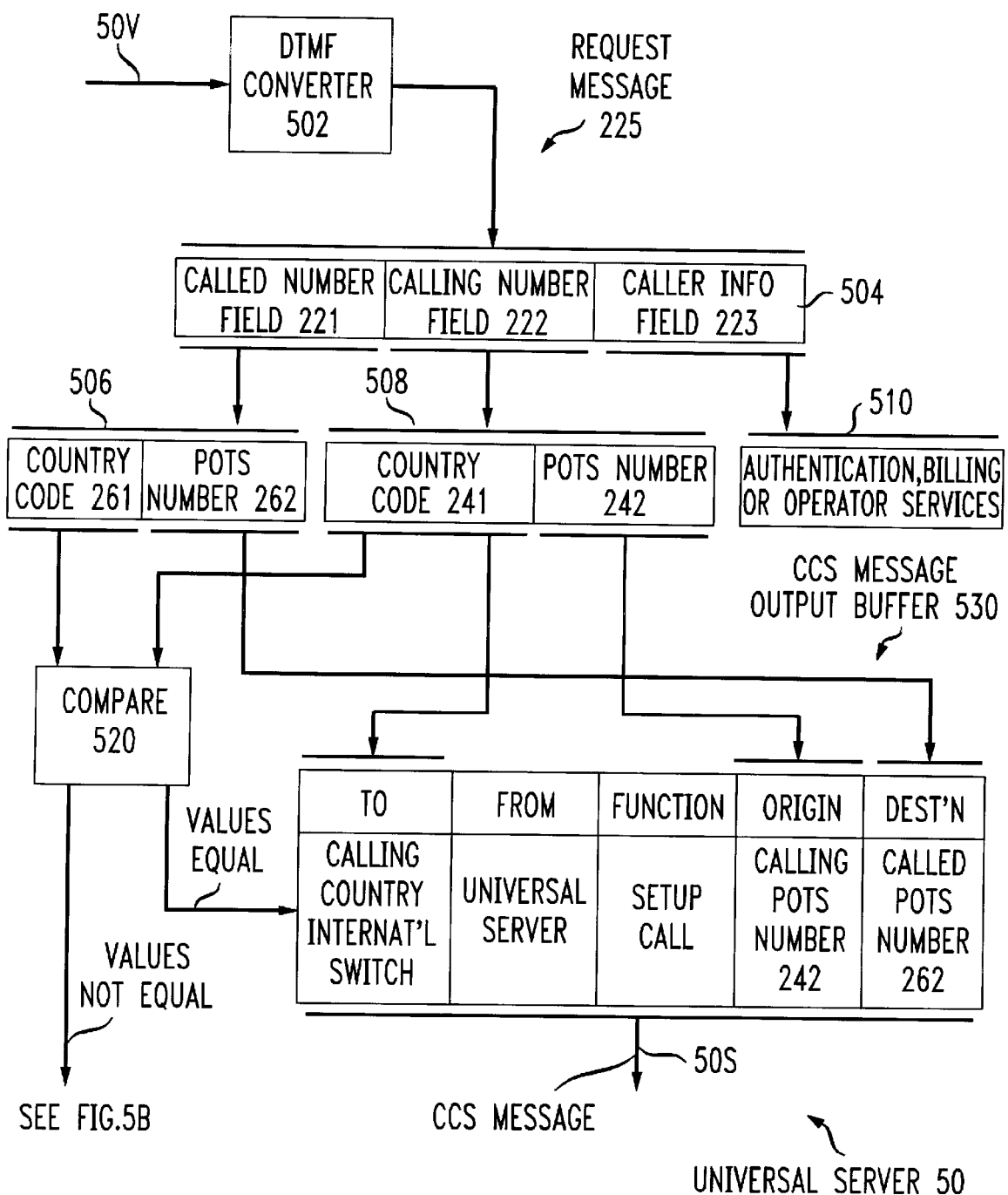
FIGS. 5A and 5B shows a functional block diagram of the universal server 50.
Figure 5B:
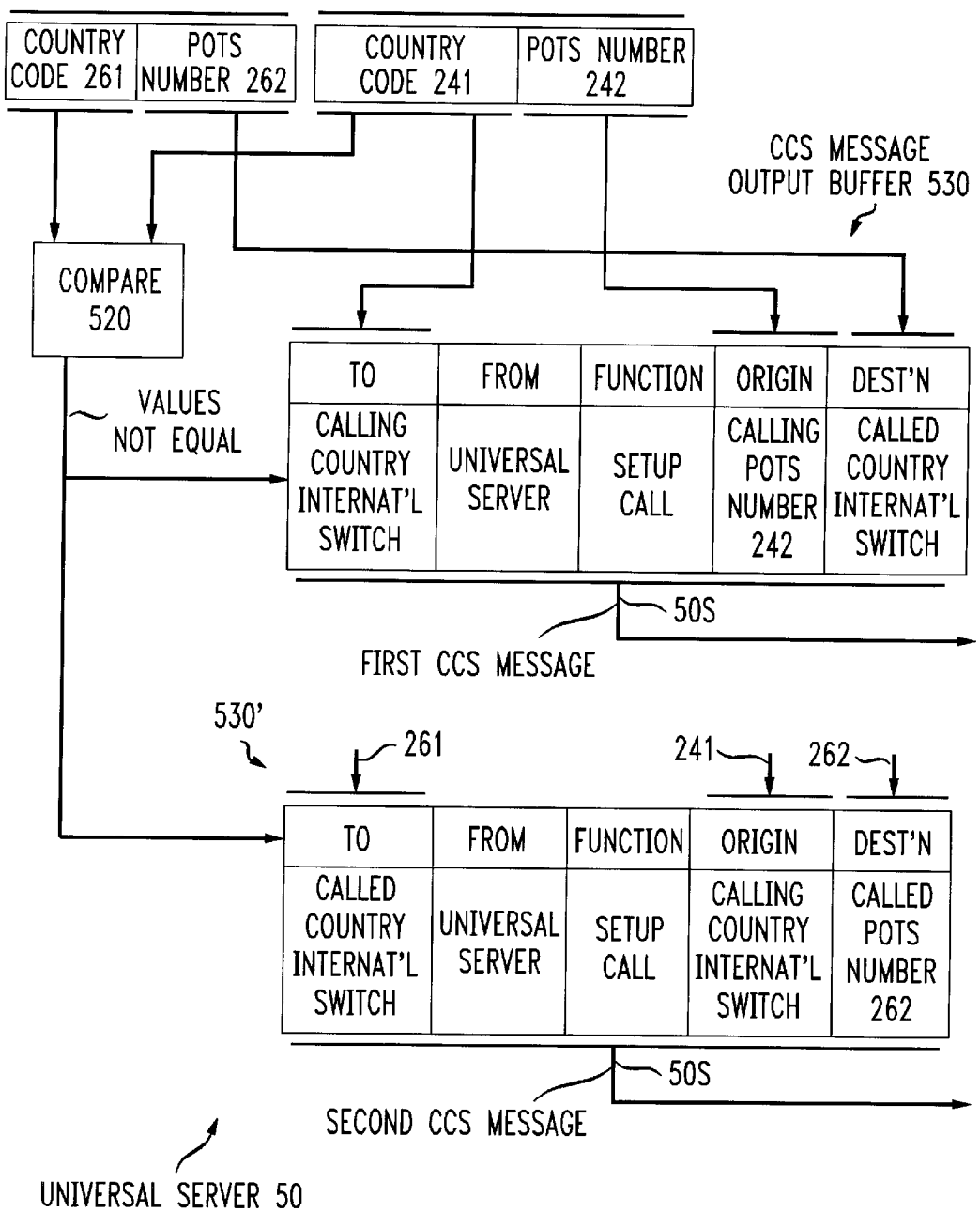

FIGS. 5A and 5B show a functional block diagram of the universal server 50. The request message 225 with its DTMF tones is received on line 50V and is converted by the DTMF converter 502 into a digital representation of the request message 225 which is stored in the register 504. The called number field 221 is then transferred to register 506 and the calling number field 222 is transferred to the register 508. Register 510 stores the caller information from field 223, for authentication, billing, operator services, or other purposes. The comparator 520 compares the country code 261 for the called number 221 with the country code 241 of the calling number field 222. If the values are equal, then the common channel signalling (CCS) message output buffer 530 prepares the CCS message shown if FIG. 5A. This circumstance obtains for example 1 of setting up a call from the London universal phone 66 to the Yorkshire conventional phone 63 within the UK telephone system 65.

Figure 1A:
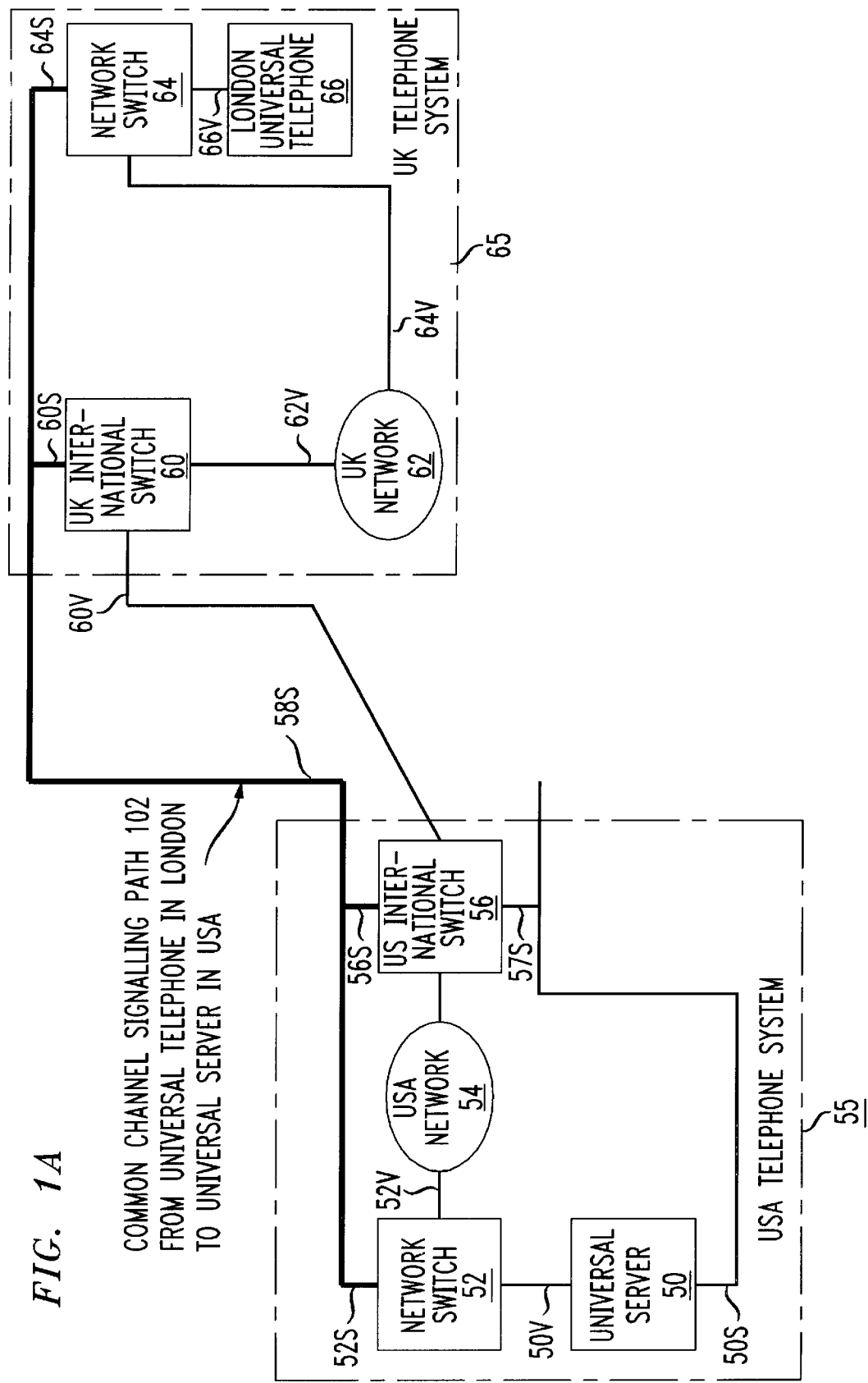
FIG. 1A shows the common channel signalling path 102 from the universal telephone in London to the universal server in the USA.
Figure 1B:
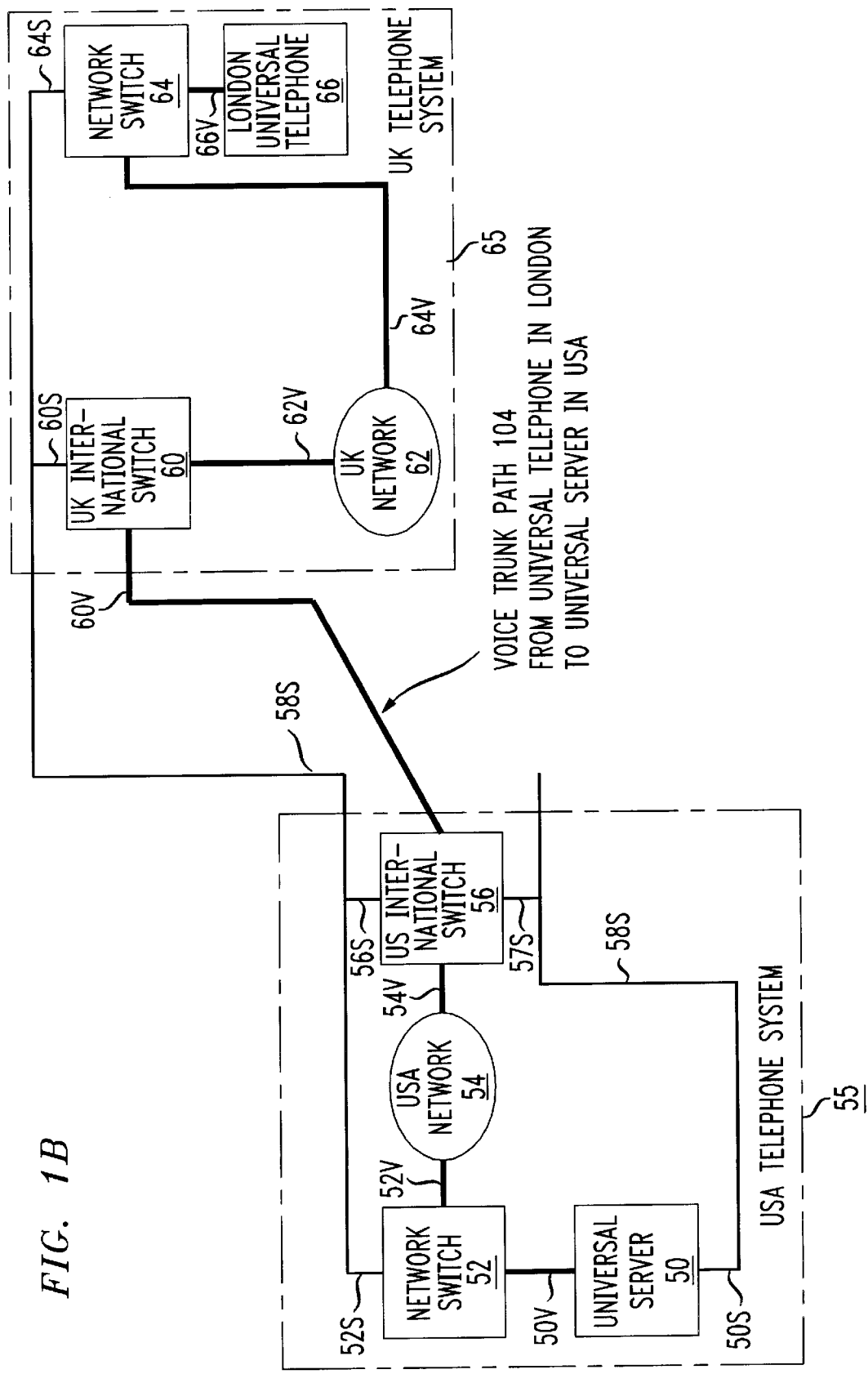
FIG. 1B shows the voice trunk path 104 from the universal telephone in London to the universal server in the USA.
Figure 1E:
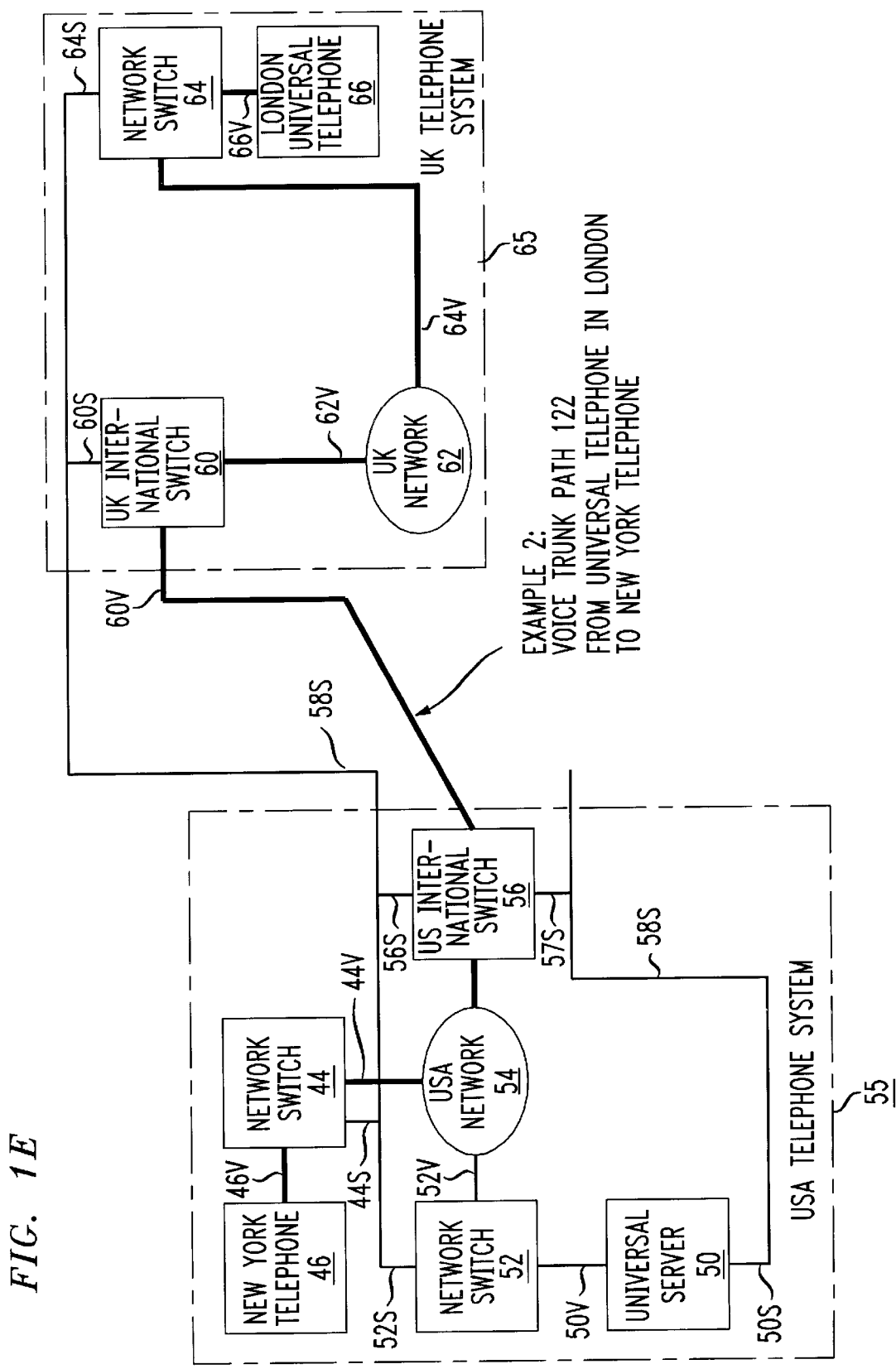
FIG. 1E shows the resulting voice path 112 in Example 2, between London and New York.

FIG. 1A shows the common channel signalling path 102 from the universal telephone 66 in London to the universal server 50 in the USA to set up the voice trunk path 104 to send the request message 225. The London universal phone 66 passes the universal server country code 251 and POTS number 252 as the network address to the network switch 64. The network switch 64 involves the common channel signalling path 102 to the network switch 52 in the USA telephone system 55, which serves the universal server 50. The CCS signalling messages passed over the signalling path 102 of FIG. 1A result in the establishment of the voice trunk path 104 in FIG. 1B from the universal telephone 66 in London to the universal server 50 in the USA. The voice trunk path 104 passes from the universal telephone 66 through line 66V and is switched by the network switch 64 onto the voice trunk 64V to the UK network 62. The CCS signalling path 102 of FIG. 1A controls the UK international switch 60 to switch the UK network 62 over the line 62V to the international voice trunk line 60V which goes to the US international switch 56. The CCS signalling path 102 of FIG. 1A then controls the US international switch 56 the connect the international voice trunk 60V over the voice trunk 54V to the USA network 54. The CCS signalling path 102 of FIG. 1A then controls the network switch 52 to connect the USA network 54 over the voice trunk 52V to the universal server 50 over line 50V. The resulting voice trunk path 104 shown in FIG. 1B transmits the request message 225 to the universal server 50.

FIG. 1C shows the example of the common channel signalling path 106 from the universal server 50 in the USA setting up the call between the London universal phone 66 and the Yorkshire telephone 63 within the UK telephone system 65. The universal server 50 uses the request message 225 received from the London universal telephone 66 to prepare the CCS message in the CCS message output buffer 530 shown in FIG. 5A. The CCS message includes a "TO" field which takes the country code 241 from the calling number field 222 as the calling country international switch destination for the CCS message. The message is from the universal server 50. Function to be performed by he CCS message is to initiate the setup of the call. The origin field is taken from the POTS number 242 from the calling number field 222. The destination field is taken from the POTS number 262 of the called number field 221. The resulting CCS message in the buffer 530 of FIG. 5A is then output on the signalling trunk 50S to the common channel signalling network 58S and is directed to the UK international switch 60. In the common channel signalling process, the UK international switch 60 will handle network switch control in the UK telephone system 65. The UK international switch 60 will configure the network switch 61 and the network switch 64 to connect the voice trunk path 108 from the Yorkshire telephone 63 to the London universal 66. This is done by connecting the Yorkshire telephone 63 over the voice trunk 63V and the voice trunk 61V to the UK network 62. The UK network 52 is then connected over the voice trunk 64V and the voice trunk 66V to the London universal telephone 66. Thus, example 1 illustrates how the universal telephone 66 located in London, UK can use the caller's string of dialing digits in the caller's home country's format, to cause the universal server 50 to setup the call from London to Yorkshire.

FIG. 5B shows the universal server 50 in the circumstance where the county code 261 of the called field 221 does not equal the country code 241 of the calling number field 222. This circumstance corresponds to example 2 of establishing a voice connection between the universal telephone 66 in the UK telephone system and a telephone 46 in the USA telephone system. This circumstance also corresponds to example 3 of establishing connection between the universal telephone 66 in the UK telephone system and another telephone 76 in the France telephone system.

Example 2, shown in FIG. 1D has the common channel signalling path 110 from the universal server 50 in the USA telephone system 55 setting up a call from the London universal telephone 66 to the New York telephone 46. In FIG. 5B, the comparator 520 will determine that the country code 261 of the called number field 221 for the New York telephone 46 does not equal the country code 241 for the calling number field 222 for the United Kingdom. Therefore two CCS messages will be prepared by server 50, the first message will be directed to the calling country's international switch, which in this case is the UK international switch 60, and a second CCS message will be directed to the called country international switch, which in this example is the US international switch 56. In FIG. 5B, the first CCS message is directed to the UK international switch 60, and it is from the universal server 50. Function to be performed is to set up a call from the origin, which is the calling POTS number 242 of the London universal telephone 66, to the destination, which is the called country international switch 56. The first CCS message of FIG. 5B directed to the UK international switch 60, will establish the first portion of the voice trunk path 112 shown in FIG. 1E from the London universal telephone 66 to the US international switch 56. This portion of the path 112 includes the voice trunk 66V, the voice trunk 64V, the UK network 62, and the voice trunk 62V connected to the UK international switch 60. This portion of the voice trunk path 112 also includes the international voice trunk 60V connecting the UK international switch 60 to the US international switch 56. Then the second CCS message assembled buffer 530' of FIG. 5B is directed from the universal server 50 to the called country international switch, which in this case is the US international switch 56. This second CCS message establishes the portion of the voice trunk path 112 in FIG. 1E from the US international switch 56 to the New York telephone 46. The origin field in the second CCS message is the calling country international switch, the UK international switch 60, and the destination field is the called POTS number 262, which in this case is the called telephone 46. The second CCS message results in the establishment of the second part of the voice trunk path 112 in FIG. 1E from the US international switch 56 through the USA network 54, the voice trunk 44B, and the network switch 44 and over the voice trunk 46V to the New York telephone 46.

Figure 1F:
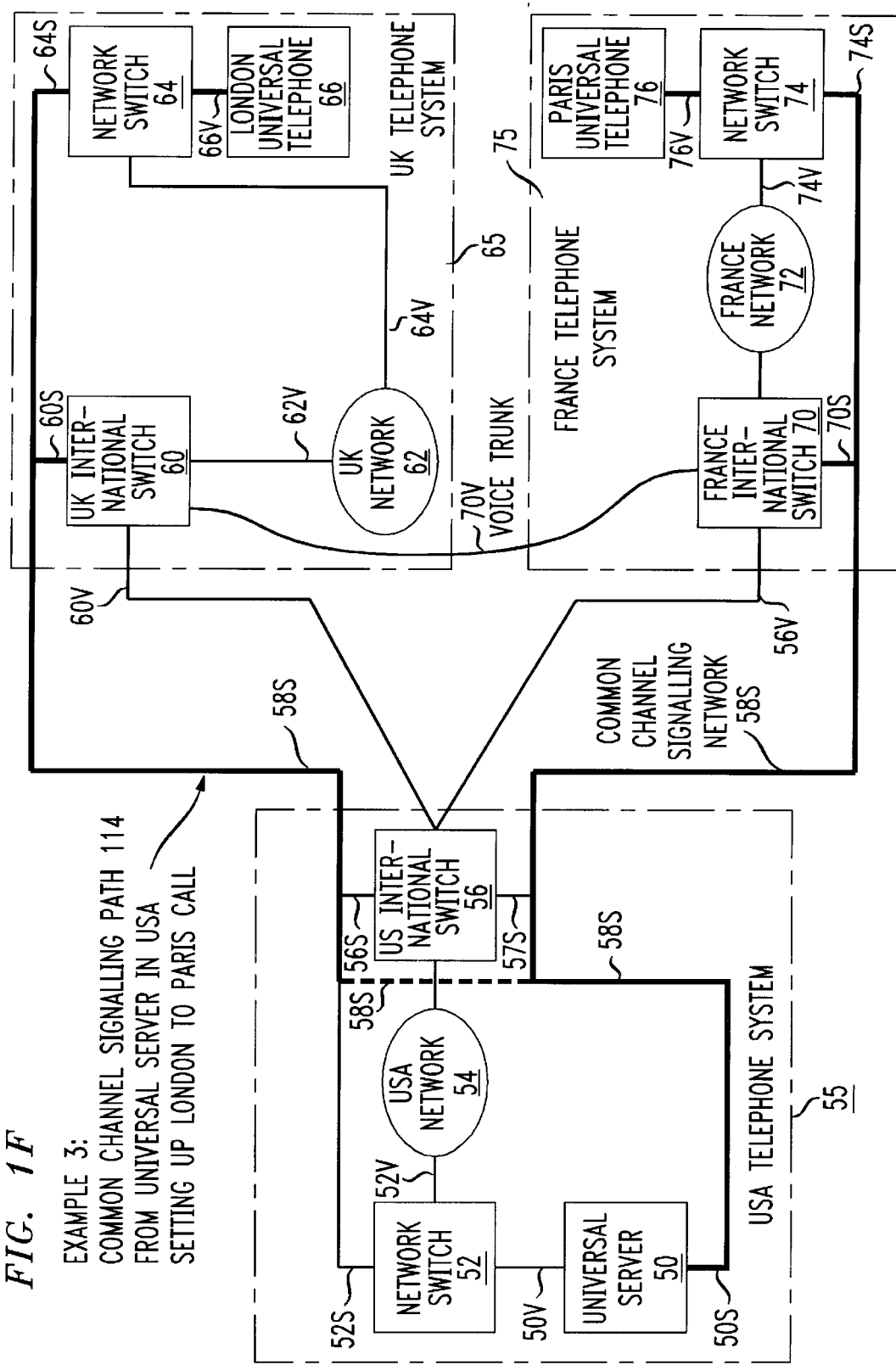
FIG. 1F shows Example 3, of the common channel signalling path 114 from the universal server in the USA setting up a call from London to Paris.
Figure 1G:
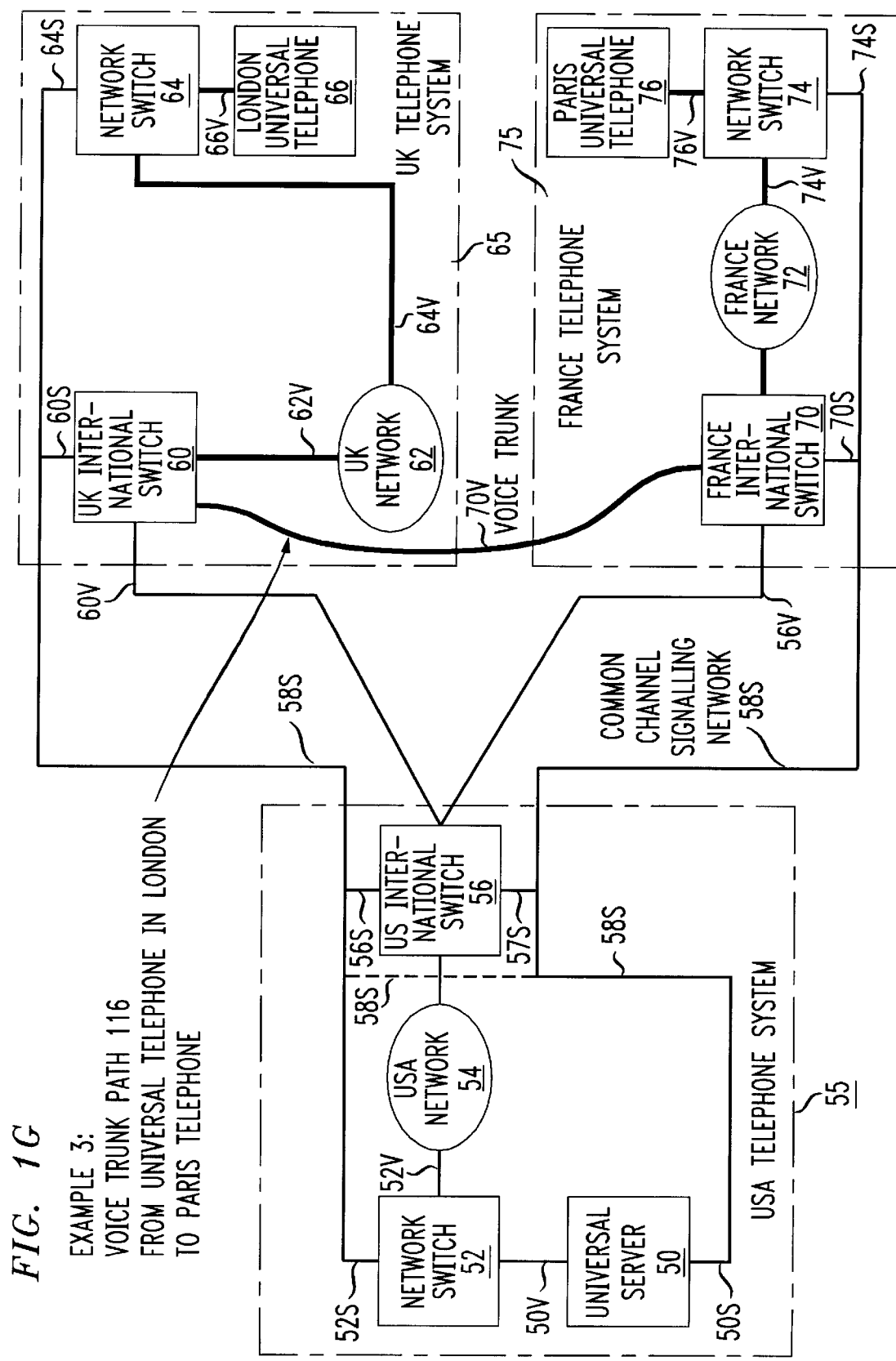
FIG. 1G shows the resulting voice path 116 in Example 3, between London and Paris.

Example 3 shown in FIG. 1F and 1G is the establishment of a call from London universal telephone 66 to a telephone 76 in the France telephone system 75. FIG. 1F shows the common channel signalling path 114 established by the universal server 50 from the universal server 50 in the USA setting up the call from the London universal telephone 66 to the Paris telephone 76. FIG. 1G illustrates the result of the call set up by the universal server 50. The voice trunk path 116 of FIG. 1G is shown from the universal telephone 66 in London to the Paris telephone 76. The voice trunk path 116 is established in a manner similar to that described for the voice trunk path 112 in FIG. 1E and as was described in conjunction with FIG. 5B. The voice trunk path 116 in FIG. 1G includes the London universal telephone 66 connected over the voice trunk 66V, the voice trunk 64V, to the UK network 62, and over the voice trunk 62V to the UK international switch 60. The UK international switch 60 is connected by means of the voice trunk 70V to a France international switch 70. The France international 70 is connected over the voice trunk 72V through the France network 72 and a voice trunk 74 to the network switch 74 which serves the Paris telephone 76. The voice trunk 76V from the network switch 74 completes the voice trunk path 116 to the Paris telephone 76.

Thus it is seen that in accordance with the invention, the caller at the universal telephone 66 forms a string of dialing digits in his home country format for transmission to the universal server. The network address of the universal server is used to transmit the request message 225 to the universal server 50, which is typically located in the caller's home country. The string of dialing digits transmitted to the universal server is translated by the universal server 50 into a network code in the common channel signalling network, that establishes the call.

FIG. 6 is a more detailed view of the smart card 320. The smart card 320 includes the memory 602 which may be a RAM or an electrically alterable read only memory. Memory 602 is connected by means of the bus 604 to the read only memory 606, the processor 612, and the interface to the universal phone 614. The interface 614 is connected by means of the electrodes 616, which engage the smart card adapter 312, when the smart card 320 is plugged into the universal telephone 66. A typical array of electrodes 616 consists of eight electrodes. Other contactless electrode arrangements can be used for electrodes 616 including inductively coupled or capacitively coupled electrodes. A suitable battery can be included with the smart card or alternately it can be powered up when it is plugged into the adapter 312. Memory 602 includes the caller information buffer 630 which includes caller's ID field 231, caller's home country field 232 and other caller information field 233 including authentication data 233A billing data 233B, caller preference data 233C and speed dialing data 233D. Universal server address buffer 650 and image buffer 670 provide information 255 and 275, respectively. Home country language message text buffer 680 provides home country language message information. The control program 690 executes on the processor 612 to provide functions performed by the smart card 320. The smart card 320 can store in the caller information buffer 630 all of the home country telephone appearance and function information needed(to present a consistent telephone service with the characteristics that telephones have in the caller's home country.

In an alternate embodiment of the invention, the universal server translation logic shown in FIGS. 5A and 5B can be included in the universal phone 66, to enable translation of the caller's dialed number in the caller's home country format, into a network code that enables establishment of the call. In this alternate embodiment, the logic of FIGS. 5A and 5B would have a pass-through connection through the network switch 64 to the to the CCS network 58S. Alternately, the translation logic of FIGS. 5A and 5B included within the universal phone 66, can be modified to translate the caller's dialed number in the caller's home country format, into the format of the foreign country where the universal phone 66 is located. The dialed number in the foreign country's format is then sent from the universal phone 66 to the network switch 64 for establishment of the call in the normal manner, as if the caller had originally dialed the number using the foreign country's format.

In another alternate embodiment of the invention, the translation logic of FIGS. 5A and 5B can be modified to translate the caller's dialed number in the caller's home country format, into the format of the foreign country where the universal phone 66 is located. This modified translation logic can then be included in the caller's smart card 320 that is inserted into the universal phone 66. The dialed number in the foreign country's format is then sent from the universal phone 66 to the network switch 64 for establishment of the call in the normal manner, as if the caller had originally dialed the number using the foreign country's format.

Although a specific embodiment of the invention has been disclosed, it will be understood by those having skill in the art that changes can be made to that specific embodiment without departing from the spirit and the scope of the invention.

What is claimed is:

1. A communications system to provide a home country telephone appearance and function for a caller visiting a foreign country, comprising:

a universal telephone located in a foreign country including a smart card adapter;

a smart card coupled by the caller to the smart card adapter, bearing information of the caller's home country;

a database coupled to the universal telephone including national telephone features that are characteristic of the caller's home country, said features being accessible by the universal telephone using the information read from the card;

said national telephone features including messages in a language of the home country and an image of a dialing key pad of the home country;

a display device coupled to the universal telephone displaying the messages and displaying the image of the dialing key pad;

a touch input device coupled to the universal telephone and positioned near the display device, outputting a key action signal in response to the caller's touch at a location near an image of a key displayed by the display device, said key action signal including dialing digits input by the caller in the home country's format; and a universal server coupled to the universal telephone, translating the caller's dialing digits into a network code that enables establishment of a caller's call.

2. The communications system of claim 1, wherein said universal telephone accesses a network address of the universal server from the database using the home country information read from the smart card.

3. The communications system of claim 1, wherein the universal server is located in the caller's home country.

4. The communications system of claim 1, wherein the universal server is located in a country other than the caller's home country.

5. The communications system of claim 1, wherein said key action signal exercises local control over the universal telephone.

6. The communications system of claim 1, wherein said key action signal initiates placing a call for assistance to an operator in the caller's home country.

7. The communications system of claim 1, wherein said key action signal initiates establishing a call between said universal telephone and another telephone in the same foreign country.

8. The communications system of claim 1, wherein said key action signal initiates establishing a call between said universal telephone and another telephone in a different foreign country.

9. The communications system of claim 1, wherein said key action signal initiates establishing a call between said universal telephone and a telephone in the caller's home country.

10. The communications system of claim 1, wherein said smart card contains said database of national telephone features that are characteristic of the caller's home country.

11. A communications method to provide a home country telephone appearance and function for a caller visiting a foreign country, comprising the steps of:

storing information of the caller's home country in a smart card;

coupling the smart card to a universal telephone located in a foreign country and reading said home country information;

accessing a database coupled to the universal telephone using said home country information, said database including national telephone features that are characteristic of the caller's home country, including messages in a language of the home country and an image of a dialing key pad of the home country;

displaying at the universal telephone the messages and the image of the dialing key pad;

outputting a key action signal in response to the caller's touch input near a location where an image of a key is displayed, said key action signal including dialing digits input by the caller in the home country's format; and translating the caller's dialing digits into a network code that enables establishment of a caller's call.

12. The communications method of claim 11, wherein said universal telephone accesses a network address of the universal server from the database using the home country information read from the smart card.

13. The communications method of claim 11, wherein the universal server is located in the caller's home country.

14. The communications method of claim 11, wherein the universal server is located in a country other than the caller's home country.

15. The communications method of claim 11, wherein said key action signal exercises local control over the universal telephone.

16. The communications method of claim 11, wherein said key action signal initiates placing a call for assistance to an operator in the caller's home country.

17. The communications method of claim 11, wherein said key action signal initiates establishing a call between said universal telephone and another telephone in the same foreign country.

18. The communications method of claim 11, wherein said key action signal initiates establishing a call between said universal telephone and another telephone in a different foreign country.

19. The communications method of claim 11, wherein said key action signal initiates establishing a call between said universal telephone and a telephone in the caller's home country.

20. The communications method of claim 11, wherein said smart card contains said database of national telephone features that are characteristic of the caller's home country.

21. An article of manufacture for use in a universal telephone computer system, comprising:

a computer useable medium having computer readable program code means embodied therein for providing a home country telephone appearance and function for a caller visiting a foreign country, using information of the caller's home country stored in a smart card and read by a universal telephone located in a foreign country, the computer readable program code means in said article of manufacture comprising:

computer readable program code means for accessing a database coupled to the universal telephone using said home country information, said database including national telephone features that are characteristic of the caller's home country, including messages in a language of the home country and an image of a dialing key pad of the home country;

computer readable program code means for displaying at the universal telephone the messages and the image of the dialing key pad; and computer readable program code means for outputting a key action signal in response to the caller's touch input near a location where an image of a key is displayed, said key action signal including dialing digits input by the caller in the home country's format.

22. The article of manufacture for use in a universal telephone computer system of claim 21, which further comprises:

computer readable program code means for translating the caller's dialing digits into a network code that enables establishment of a caller's call.

23. A communications method to provide a home country telephone appearance and function for a caller visiting a foreign country, comprising the steps of:

coupling a smart card to a universal telephone located in a foreign country and reading home country information therefrom;

accessing a database coupled to the universal telephone using said home country information to obtain national telephone features that are characteristic of the caller's home country;

manifesting at the universal telephone the national telephone features;

receiving dialing digits at the universal telephone input by the caller in the home country's format; and translating the caller's dialing digits into a code that enables establishment of a call.

24. The communications method of claim 23, wherein said dialing digits input by the caller initiate accessing translation logic that performs said translating step.

25. The communications method of claim 24, wherein said translation logic is located in the caller's home country.

26. The communications method of claim 24, wherein said translation logic is located in said universal telephone.

27. The communications method of claim 24, wherein said translation logic is located in said smart card.

28. The communications method of claim 23, wherein said dialing digits input by the caller exercise local control over the universal telephone.

29. The communications method of claim 23, wherein said dialing digits input by the caller initiate placing a call for assistance to an operator in the caller's home country.

30. The communications method of claim 23, wherein said dialing digits input by the caller initiate establishing a call between said universal telephone and another telephone in the same foreign country.

31. The communications method of claim 23, wherein said dialing digits input by the caller initiate establishing a call between said universal telephone and another telephone in a different foreign country.

32. The communications method of claim 23, wherein said dialing digits input by the caller initiate establishing a call between said universal telephone and a telephone in the caller's home country.

33. The communications method of claim 23, wherein said smart card contains said database of national telephone features that are characteristic of the caller's home country.

34. A communications system to provide a home country telephone appearance and function for a caller visiting a foreign country, comprising:

a universal telephone located in a foreign country adapted to read a smart card presented by a caller, bearing information of the caller's home country;

a database coupled to the universal telephone including national telephone features that are characteristic of the caller's home country, said features being accessible by the universal telephone using the information read from the card;

a display device coupled to the universal telephone displaying the national telephone features;

an input device coupled to the universal telephone to receive dialing digits input by the caller in the home country's format; and translating logic coupled to the universal telephone, translating the caller's dialing digits into a code that enables establishment of a call.

35. The communications system of claim 34, wherein said translation logic is located in the caller's home country.

36. The communications system of claim 34, wherein said translation logic is located in said universal telephone.

37. The communications system of claim 34, wherein said translation logic is located in said smart card.

38. The communications system of claim 34, wherein said dialing digits input by the caller exercise local control over the universal telephone.

39. The communications system of claim 34, wherein said dialing digits input by the caller initiate placing a call for assistance to an operator in the caller's home country.

40. The communications system of claim 34, wherein said dialing digits input by the caller initiate establishing a call between said universal telephone and another telephone in the same foreign country.

41. The communications system of claim 34, wherein said dialing digits input by the caller initiate establishing a call between said universal telephone and another telephone in a different foreign country.

42. The communications system of claim 34, wherein said dialing digits input by the caller initiate establishing a call between said universal telephone and a telephone in the caller's home country.

43. The communications system of claim 34, wherein said smart card contains said database of national telephone features that are characteristic of the caller's home country.

* * * * *